H. R. HUGHES.
ROLLER BORING DRILL.
APPLICATION FILED JUNE 20, 1913.

1,130,289. Patented Mar. 2, 1915.

Witnesses:
Geo. F. Kadson
C. M. Badger

Inventor,
Howard R. Hughes.
By Bakewell & Church attys.

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

ROLLER BORING-DRILL.

1,130,289.  Specification of Letters Patent.  Patented Mar. 2, 1915.

Application filed June 20, 1913. Serial No. 774,772.

*To all whom it may concern:*

Be it known that I, HOWARD R. HUGHES, a citizen of the United States, residing at Houston, Texas, have invented a certain new and useful Improvement in Roller Boring-Drills, of which the following is a full, clear, and exact description, such as will enable others skilled in the art to which it appertains to make and use the same.

This invention relates to roller boring drills, and has for one of its objects to provide an inexpensive drill of novel design that is particularly adapted for use in material which is of such formation that it is liable to cave in frequently when a hole is being drilled through same.

Another object is to provide a roller boring drill in which the cutting device or devices that maintain the clearance of the drill-head can be adjusted to compensate for wear or to vary the cutting area of the drill, thus overcoming the necessity of mounting new cutting devices on the head of the drill after the original cutting devices have become worn to such a degree that the drill loses its clearance.

Another object is to provide a roller boring drill having cutting rollers that can be replaced at small cost after they have worn out or become damaged.

Another object is to provide a roller boring drill of novel design in which the cutting rollers are mounted on spindles that are supported at both ends by substantial bearings on the head of the drill. And still another object is to provide a roller boring drill in which the cutting rollers are arranged in a novel manner that tends to prevent the roller or rollers that maintain the clearance of the head from moving out of its normal path during the operation of drilling a hole.

Other objects and desirable features of my invention will be hereinafter pointed out.

Figure 1:
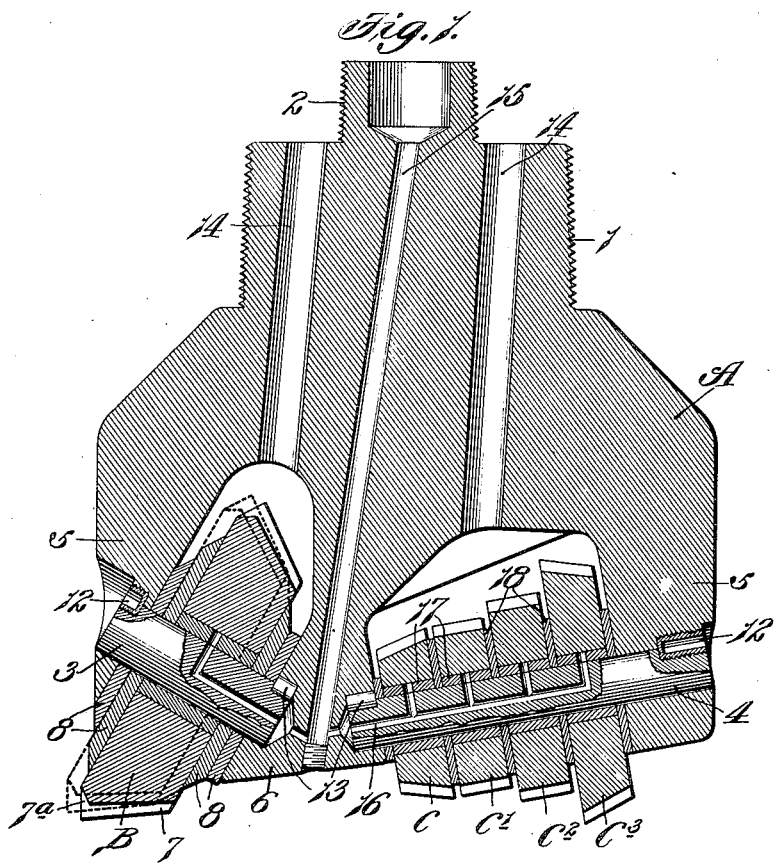
Figure 2:
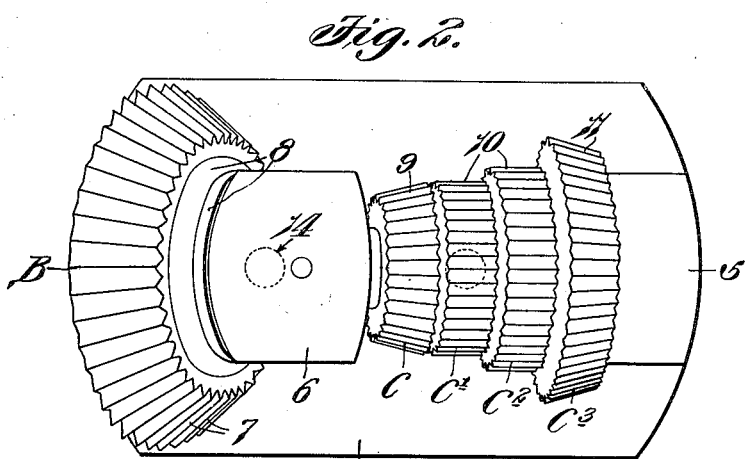

Figure 1 of the drawings is a vertical sectional view of a roller boring drill constructed in accordance with my invention; and Fig. 2 is a bottom plan view of said drill.

Referring to the drawings which illustrate the preferred form of my invention, A designates the head of the drill which is preferably formed in one piece and provided at its upper end with a screw-threaded boss 1 to which the hollow drill stem or operating member, not shown, is connected. A ring-shaped flange 2 is also provided at the upper end of the head so as to support a lubricant-holder, not shown.

An approximately frusto-conical-shaped cutting roller B is mounted on a spindle 3 that inclines downwardly and inwardly toward the longitudinal axis of the head A, and a group of comparatively small cutting rollers C, $C^1$, $C^2$, and $C^3$ are mounted diametrically opposite the roller B on a spindle 4 that is inclined slightly but at a less angle than the spindle 3. The head A is provided with side bearings 5 that support the outer ends of the spindles 3 and 4 and a center bearing 6 that supports the inner ends of said spindles, said bearings being preferably formed integral with the head A and being so shaped that they will take up the end thrusts of the cutting rollers mounted on the spindles which said bearings support. The approximately frusto-conical-shaped roller B is preferably so arranged that the vertex of same lies in the longitudinal center of the drill head, and said roller is provided with longitudinally disposed chisel-teeth 7 that operate on the material at the bottom of the hole and also chisel-teeth $7'$ that shear off the material at the side of the hole being formed, said roller B being so positioned that the teeth $7^a$ of same will remove sufficient material from the side of the hole to maintain clearance for the head of the drill and thus prevent it from sticking or binding in the hole. One of the novel features of my present invention consists of means for enabling the roller B to be adjusted so as to vary the cutting area of the drill or compensate for wear on the teeth $7^a$ at the outer end of said roller. The means herein shown for accomplishing this consists of a plurality of washers 8 arranged on the spindle 3 on opposite sides of the roller B, as shown in Fig. 2. When the teeth $7^a$ of the roller B become worn or if it is desired to increase the cutting area of the drill one or more of the washers 8 at the outer end of the roller B can be removed and arranged on the opposite side of said roller, namely, between the inner end of the roller and the center bearing 6, thus locating the roller B in such a position that the base portion or outer end of same on which the teeth 7ª are formed, projects farther from the side of the head A, as shown in broken lines in Fig. 1. This is a very desirable feature of a roller boring drill for it enables the drill to be used after the roller B has become worn to such a degree that the drill has lost its clearance. In drilling a well great delay is often caused in obtaining a new cutting roller to take the place of one that has become worn to such a degree that the drill has lost its clearance. Moreover, it was often necessary prior to my present invention, to discard a roller whose end teeth had worn off so that the cost of keeping a roller boring drill in operative condition when the drill was being used in a hard, rocky formation was often quite high. In my improved drill the roller B can be adjusted to compensate for wear on the cutting teeth 7ª which maintain the clearance for the drill head so that it is not necessary to suspend the drilling operation until a new roller can be obtained.

While I have herein shown and described one particular means for adjusting the roller B, it will, of course, be obvious that various other means could be used for this purpose and therefore I do not wish it to be understood that my broad idea is limited to a drill in which the cutting roller is adjusted in the manner herein illustrated and described or to a drill provided with cutting rollers of the kind herein shown.

The rollers C, C¹, C², and C³ that are mounted on the spindle 4 are comparatively small, and therefore can be manufactured at a low cost. The roller C is slightly frusto-conical-shaped and is arranged with its base end or large end presented outwardly so that it will form a slightly pyramidal-shaped projection at the center of the hole that tends to center the drill head, the cutting teeth 9 on said roller extending longitudinally of same. The intermediate rollers C¹ and C² have cutting teeth 10 that extend parallel to the axis or spindle 4 about which said rollers revolve, but the end roller C² of this group is approximately frusto-conical-shaped and is provided with cutting teeth 11 that extend at an angle to the spindle 4, the roller C³ being arranged in the opposite manner to the roller C or so that its base or larger end is presented inwardly. By arranging the roller C³ in this manner I overcome the side thrusts caused by the roller B. That is to say, the approximately frusto-conical-shaped roller C³ is mounted on the head A in such a manner that when it is cutting on the material at the bottom of the hole it tends to force the head laterally in the opposite direction to the side thrust caused by the action of the roller B on the side of the hole.

Any suitable means may be employed for retaining the spindles 3 and 4 in operative position in the head A, and the means herein shown for this purpose consists of set-screws 12 at the outer ends of the spindles which extend longitudinally of same and are screwed into coöperating openings formed partly in the spindles and partly in the head A, as shown in Fig. 1. In order to reduce the torsional strains on said spindles, dowels 13 are arranged longitudinally of the spindles in coöperating openings formed in the inner end portions of the spindles and in the center bearing 6. The head is provided with water openings 14 so as to direct jets of water downwardly onto the material that the cutting rollers disintegrate, and a lubricating duct 15 is formed in the head so as to conduct the lubricating medium from the lubricant-holder to ducts 16 in the spindles which have branches that lead laterally to the surfaces about which the rollers of the drill revolve. If desired, bronze bushings 17 or bushings of any other suitable material may be forced onto the spindles 3 and 4 so as to form bearing surfaces for the rollers, and washers 18 are preferably arranged between the rollers C, C¹, C² and C³ so as to hold said rollers spaced apart and also hold the end rollers C² and C³ away from the center bearing 6 and the side bearing 5.

A drill of the construction above described is inexpensive to manufacture, it is particularly adapted for use in a formation which is liable to cave in, the cutting means that maintains the clearance for the head can be adjusted to compensate for wear, the cutting rollers are so arranged that the tendency for the head to wobble is reduced to a minimum, and the rollers are mounted in spindles which are securely supported at both ends by bearings on the head.

Having thus described my invention, what I claim as new and desire to secure by Letters Patent is:

1. A well drill comprising a vertically-disposed head that is adapted to be connected to a drill stem, a roller mounted on a spindle on said head and provided with a cutting surface that removes the material from the side wall of the hole and thus maintains the clearance for the head, and means for enabling said roller to be adjusted longitudinally of said spindle so as to compensate for wear on said cutting surface or to vary the clearance for the head.

2. A well drill comprising a vertically-disposed head that is adapted to be connected to a drill stem, a roller arranged in a pocket in said head and having a cutting surface that extends approximately parallel to the side wall of the hole which removes sufficient material from said side wall to maintain the clearance for the head, and removable devices arranged between the ends of said roller and the side walls of said pocket for enabling said roller to be adjusted so as to compensate for wear on said cutting surface.

3. In a well drill, a vertically disposed head that is adapted to be connected to a drill stem, means on said head for disintegrating the material at the center of the hole, a rotatable cutter arranged in a pocket in said head for removing the material from the side wall of the hole so as to maintain clearance for the drill head, and removable devices interposed between the ends of said cutter and the walls of said pocket so as to enable said cutter to be adjusted to compensate for wear on same.

4. In a well drill, a vertically-disposed head that is adapted to be connected to a drill stem, a substantially frusto-conical-shaped cutter arranged on said head in such a manner that the tapered portion of same acts on the bottom of the hole adjacent the side wall of the hole, a cutting surface at the base end of said cutter that removes the material from the side wall of the hole so as to maintain clearance for the head, means for enabling said cutter to be adjusted so as to compensate for wear on the cutting surface at the base end of same, and an independent group of cutting rollers mounted on a spindle that extends transversely of the head for acting on the bottom of the hole that lies inside of the cutting zone of said frusto-conical-shaped cutter.

5. A well drill comprising a vertically-disposed head that is adapted to be connected to a drill stem, an approximately frusto-conical-shaped cutting roller on said head that acts on the bottom of the hole and which is provided at its outer end with a cutting surface that acts on the material at the side of the hole, the head being provided with portions that are arranged opposite to the end faces of said roller, and removable devices interposed between said portions and the roller for enabling said roller to be adjusted so as to compensate for wear on said cutting surface.

6. A well drill comprising a vertically-disposed head that is adapted to be connected to a drill stem, an approximately frusto-conical-shaped cutting roller on said head whose axis of rotation is inclined downwardly and inwardly toward the longitudinal center of the head, and removable devices against which the ends of said roller bear, said devices being adapted to be arranged in different positions so as to enable said roller to be adjusted longitudinally of its axis of rotation so as to vary the distance between the vertical center of the head and the outer edge portion of said roller.

7. A well drill comprising a vertically-disposed head that is adapted to be connected to a drill stem, a spindle on said head which inclines downwardly and inwardly toward the longitudinal center of the head, an approximately frusto-conical-shaped cutting roller arranged on said spindle with its base end presented outwardly, the head being provided with a pocket for receiving said roller, and removable devices on said spindle on opposite sides of said roller which bear against the side walls of said pocket, said devices being adapted to be arranged in different positions so as to change the position of the roller on the spindle.

8. A well drill comprising a vertically disposed head provided with bearings, an inclined spindle supported by said bearings, an approximately frusto-conical-shaped cutting roller on said spindle and provided at its base end with a cutting surface that removes the material from the side of the hole being formed, and removable spacing devices mounted on said spindle between said bearings and the end faces of the roller that is mounted on the spindle so as to enable the roller to be adjusted longitudinally of said spindle to compensate for wear of the cutting surface at the base end of the roller.

9. A roller boring drill, comprising a head provided with cutting devices that form a round hole in which no center core is left standing, two of said devices consisting of approximately frusto-conical-shaped cutting rollers arranged on opposite sides of the longitudinal axis of the head, one with its base end presented outwardly and the other with its base end presented inwardly.

10. A roller boring drill comprising a head, an approximately frusto-conical-shaped roller arranged on said head in an inclined position with its base end presented outwardly, and a group of relatively small rollers on said head arranged diametrically opposite said approximately frusto-conical-shaped roller for disintegrating the material on the bottom of the hole from the center of the hole to the path described by said approximately frusto-conical-shaped roller, said frusto-conical-shaped roller being provided at its base end with a cutting surface that removes the material from the side of the hole being formed and said small rollers being mounted on a spindle whose inner end inclines downwardly.

11. A roller boring drill comprising a head provided with side bearings and with a center bearing that is arranged at one side of the longitudinal center of the head, an approximately frusto-conical-shaped cutting roller arranged in an inclined position between said center bearing and one of said side bearings, and a separate and distinct rotatable cutting means arranged between said center bearing and the other side bearing ing that travels in a different circular path from that described by said approximately frusto-conical-shaped roller.

12. A roller boring drill comprising a head provided with side bearings and with a center bearing that is located at one side of the vertical center of the head, an approximately frusto-conical-shaped cutting roller arranged between said center bearing and one of said side bearings with its base end presented outwardly, the axis of rotation of said roller being inclined downwardly and inwardly, and a group of relatively small rollers arranged between said center bearing and the other side bearing in such a manner that they cut the material lying inside of the cutting zone of said conical-shaped roller.

13. A roller boring drill comprising a head provided with side bearings and with a center bearing that is located at one side of the vertical center of the head, an approximately frusto-conical-shaped cutting roller arranged in an inclined position between said center bearing and one of said side bearings with its base end presented outwardly and a group of relatively small rollers arranged between said center bearing and the other side bearing in such a manner that they will travel in different paths from the path described by said approximately frusto-conical-shaped roller, the outer roller of said group being approximately frusto-conical-shaped and arranged with its base end presented inwardly and the inner roller of said group being approximately frusto-conical-shaped and arranged with its base end presented outwardly.

14. A roller boring drill comprising a head provided with side bearings and with a center bearing that is located at one side of the longitudinal center of the drill head, inclined spindles supported in said bearings, one of said spindles being arranged at a greater inclination than the other and provided with an approximately frusto-conical-shaped roller having cutting teeth that remove the material from the side of the hole, and a group of relatively small rollers mounted on the other spindle.

15. A roller boring drill comprising a head provided with side bearings and with a center bearing that is arranged adjacent the center of the head, but at one side of the longitudinal center of the head, an inclined spindle supported in said center bearing and in one of said side bearings, removable means for retaining said spindle in position, an approximately frusto-conical-shaped cutting roller rotatably mounted on said spindle, a spindle extending transversely of the head in the same direction as said inclined spindle and supported at its opposite ends in said center bearing and the other side bearing and provided with a group of relatively small rollers which travel in a different path from that described by said approximately frusto-conical-shaped roller, and ducts for supplying a lubricating medium to the bearing surfaces on which said rollers turn.

In testimony whereof I hereunto affix my signature in the presence of two witnesses, this eleventh day of June 1913.

HOWARD R. HUGHES.

Witnesses:
HYMAN LEVIN,
EARL LEIB.